(12) United States Patent
Chapman et al.

(10) Patent No.: US 6,330,226 B1
(45) Date of Patent: Dec. 11, 2001

(54) TCP ADMISSION CONTROL

(75) Inventors: Alan Stanley John Chapman, Kanata (CA); Hsiang-Tsung Kung, Lexington, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/014,110

(22) Filed: Jan. 27, 1998

(51) Int. Cl.[7] .................................................. B65H 9/08
(52) U.S. Cl. ........................ 370/232; 370/233; 370/234
(58) Field of Search .................................... 370/229, 241, 370/230, 231, 232, 233

(56) References Cited

U.S. PATENT DOCUMENTS

| | | | |
|---|---|---|---|
| 5,349,578 | * | 9/1994 | Tatsuki et al. ........................ 370/244 |
| 5,361,372 | * | 11/1994 | Rege et al. ............................ 395/800 |
| 5,410,536 | * | 4/1995 | Shah et al. ............................ 370/216 |
| 5,444,706 | * | 8/1995 | Osaki .................................... 370/230 |
| 5,553,057 | * | 9/1996 | Nakayama ............................ 370/241 |
| 5,729,530 | * | 3/1998 | Kawaguchi et al. ................. 370/236 |
| 5,812,525 | * | 9/1998 | Teraslinna ............................ 370/229 |
| 6,041,038 | * | 3/2000 | Aimoto ................................. 370/229 |

FOREIGN PATENT DOCUMENTS

| | | |
|---|---|---|
| 0 473 188 | 3/1992 | (EP) . |
| 99/66676 | 12/1999 | (WO) . |

\* cited by examiner

*Primary Examiner*—Hassan Kizou
*Assistant Examiner*—Thien Tran
(74) *Attorney, Agent, or Firm*—Allan P. Millard

(57) ABSTRACT

Congestion at a network node can be aggravated by having too many TCP connections. A simple method of avoiding the bad effects of too many TCP connections is to limit the number of connections. Limiting the number of connections is achieved by an admission control which delays or even discards the connection set-up packets. TCP traffic flows are monitored to generate packet loss characteristics and when a certain condition is met, a connection request queue is disabled.

20 Claims, 6 Drawing Sheets

TCP ADMISSION CONTROL

FIELD OF THE INVENTION

The invention relates generally to traffic congestion management of a data network. In particular, it is directed to a technique by which congestion in the data network is controlled by limiting new TCP connection setups based on packet loss characteristics of the data network.

BACKGROUND OF THE INVENTION

The current data networks are handling not only enormous volume of traffic but more and more diversified multi media traffic, causing the data network to become congested more often. When congestion causes an excessive number of packets to be dropped, it can easily impact many traffic flows, and cause many timeouts. By guaranteeing a certain number of traffic flows a minimum bandwidth and treating the remainder as best effort, it is possible to avoid spreading high packet loss over so many flows and to reduce the number of aborted flows. Pending U.S. patent application Ser. No. 08/772,256 filed on Dec. 23, 1996 and Ser. No. 08/818,612 filed on Mar. 14, 1997 by the present inventors describe dynamic traffic conditioning techniques which make use of this concept. The dynamic traffic conditioning techniques described therein allow the network to discover the nature of the service for each traffic flow, classify it dynamically, and exercise traffic conditioning by means of such techniques as admission control and scheduling when delivering the traffic downstream to support the service appropriately.

Congestion at a network node can be aggravated by having too many TCP connections. TCP will adjust to try to share bandwidth among all connections but when the available buffer space is insufficient, time-outs will occur and as the congestion increases there will be an exponentially growing number of packets resent. The effect of having too many connections is that much of the bandwidth in the upstream network is wasted carrying packets that will be discarded at the congested node because there is not enough buffer there.

A simple method of avoiding the bad effects of too many TCP connections is to limit the number of connections or to discard one or more packets from one or more existing connections. Limiting the number of connections is achieved by an admission control which delays or even discards the connection set-up packets. In the case of discarding packets, which packets and from which connection to discard packets are decided by preset algorithms or policies. By invoking this control to limit the number of connections, each packet is inspected to see if it is a connection set-up packet, e.g., TCP SYN packet. This control packet is used to initiate a TCP connection and no traffic can flow until it is acknowledged by the other end of the proposed connection.

In one example, a decision to invoke the admission control, i.e. deciding when to limit the TCP traffic, can be made as follows:

Keep track of all TCP connections and thus keep count of the total number. Apply a calculation to see how many connections the available buffer can support and limit new connections. This is not a good way for a general implementation because it requires keeping state information on all TCP flows and being provided with information on the configured buffer size.

A better solution is when buffers get full and packet loss gets above some configured threshold, an admission control algorithm will apply some policy to reduce connections or the amount of traffic to keep the loss below the threshold. The reduction can be by discarding traffic from existing connections or, preferably, by preventing new connections from being set up.

The invention performs the admission control algorithm to achieve this effect.

OBJECTS OF INVENTION

It is therefore an object of the invention to provide a method of managing a data network for congestion.

It is a further object of the invention to provide a method of continuously monitoring the TCP traffic flows for congestion in a data network.

It is another object of the invention to provide a method of managing the data network by performing admission control for TCP traffic.

It is yet an object of the invention to provide a method of managing the data network by exercising the connection admission control for a new TCP connection request based on the packet loss characteristic.

SUMMARY OF THE INVENTION

Briefly stated, the invention resides in a packet data network for multimedia traffic having one or more nodes in which network one or more packets are discarded to control congestion. According to one aspect, a method of performing admission control to connection oriented traffic flows comprises steps of monitoring packets of all the traffic flows, deriving a packet loss characteristic of the traffic flows and disabling the serving of a new connection request when the packet loss characteristic matches a predefined pattern.

In another aspect, a method of performing admission control to TCP traffic flows comprises steps of storing all TCP connection setup packets in a connection request queue, monitoring packets of all active TCP traffic flows according to their port numbers and sequence numbers, and recording the count of either resent or discarded packets for any TCP traffic flows. The method further includes steps of building a history table containing the history of the sequence numbers, port numbers, and the count of either resent or discarded packets, computing a packet loss characteristic using the contents of the history table, and deciding enabling or disabling the connection request queue based on the packet loss characteristic with respect to a predefined pattern.

In a further aspect, the invention is directed to a TCP admission control apparatus for controlling congestion of a data network. The apparatus comprises a TCP output buffer for buffering and inspecting all the TCP packets of an incoming traffic flow, and a connection request queue for storing new connection requests. The apparatus further includes a history table for storing traffic information with respect to the TCP packets inspected above to derive a packet loss characteristic, and a queue controller for enabling or disabling the connection request queue upon detecting the matching of the packet loss characteristic with a predefined pattern.

DETAILED DESCRIPTION OF THE PREFERRED EMBODIMENTS OF THE INVENTION

Figure 1:
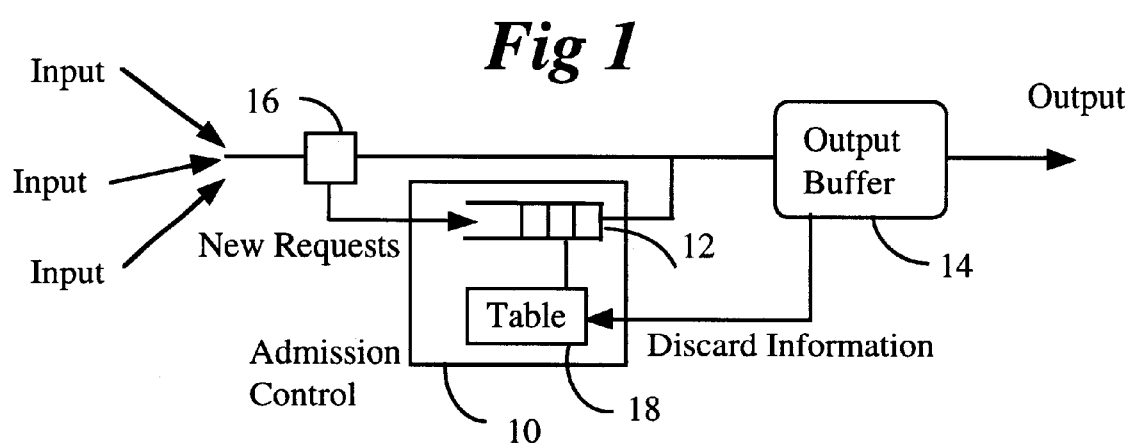
FIG. 1 is a schematic diagram of the admission control according to an embodiment of the invention.

Referring to FIG. 1, the TCP admission control apparatus 10, according to one embodiment of the invention, includes a connection request queue 12. It is located at or near the output buffer 14 of a node of a data network. It should be noted that an admission control apparatus can be a separate device or can be made integral with or to reside in any node or link equipment. It should also be understood that TCP traffic flows as a whole can be processed by an apparatus or separate apparatus can be provided for each traffic flow or a group of traffic flows in one class. Every packet of an input stream is inspected and TCP packets are identified at the output buffer 1 using, for example, source and destination IP addresses, source and destination port numbers and protocol. All new connection requests are read at a connection reader 16 and are stored at the connection request queue 12. The connection request queue 12 is a FIFO. If admission control is not invoked then the new connection requests will be served immediately by enabling the connection request queue. If admission control is switched on then they will be delayed.

The admission control detects the packets that are being discarded and looks for multiple successive packets from the same flow or multiple instances of the same packet, the latter being the result of packet resends due to packet loss or discard. The admission control derives some pattern of packet discards by using a discard measure. For convenience, this measure is called packet loss characteristic in this specification. It is possible that other parameters can be used to indicate the state of congestion in a data network. If certain criteria are met or the packet loss characteristic matches a predefined pattern, admission control is invoked and any new connection requests (connection set-up packets) will be delayed by disabling the connection request queue or packets belonging to one or more existing connections will be discarded until the problem clears. If a connection set-up packet is delayed too long (e.g., one second), it will be discarded from the queue.

When the packet loss characteristic shows that new connections can be accepted the servicing of the connection request queue is enabled. Waiting connection requests can be served immediately or can be released at a controlled pace according to a predefined algorithm.

The admission control apparatus therefore includes a small history table 18 and information about discarded packets is entered into it. When a packet is discarded, the flow identity (source and destination IP plus TCP socket number) is extracted and compared with current table entries. If the flow already has an entry then the history is updated. If the flow does not have an entry and there is room for a new entry, the new entry is made. If there is no room for a new entry the information is discarded.

The admission control can be performed on a traffic link or at a router.

In the case where the admission control is performed on the traffic link, the history table contains, for each active flow (or as many flows as can be handled), the following entries:

The first entry is a count of resent packets for that flow (Total Packet Resent).

The second entry is a count of how many times the currently recorded packet (that is the currently stored sequence number) has been resent (Same Packet Resent).

The third entry is the time that the most recent update was made for that flow. After some period of inactivity the flow is taken out of the table.

This information is used to look for patterns of discard that indicate congestion problems. It is assumed that if the sequence number on an arriving packet is lower than or equal to the stored value, then it must be a resend. The total number of resends as a fraction of the total number of packets is a measure of downstream congestion. In this embodiment, this measure is used as the packet loss characteristic.

Seeing the same packet resent multiple times will suggest that the connection is experiencing time-out or at least a very high loss rate. It is not usual for a packet to be discarded multiple times. Normally the TCP protocol will adjust its window to fit the available bandwidth and will only lose one packet before reducing that window. Although TCP relies on packet loss to constantly test for available bandwidth, a packet that is discarded once will almost certainly be forwarded when it is retransmitted. Multiple instances of the same packet will suggest that the TCP source is experiencing time-out.

There will be many variations on what information is stored and what algorithm is used to assess whether new connections should be enabled.

It is not necessary to keep information on all flows since a sampled history is sufficient to detect problem conditions.

Entries in the history table are removed after a period of time. Also, whenever admission control is invoked, the history table is cleaned out and starts fresh to get a good picture of the new loss characteristic. The history table would be purged, in any case, at regular intervals to keep the history reflecting current loss characteristics. The interval would be configurable depending on line rates and expected number of flows, etc.

Figure 2A:
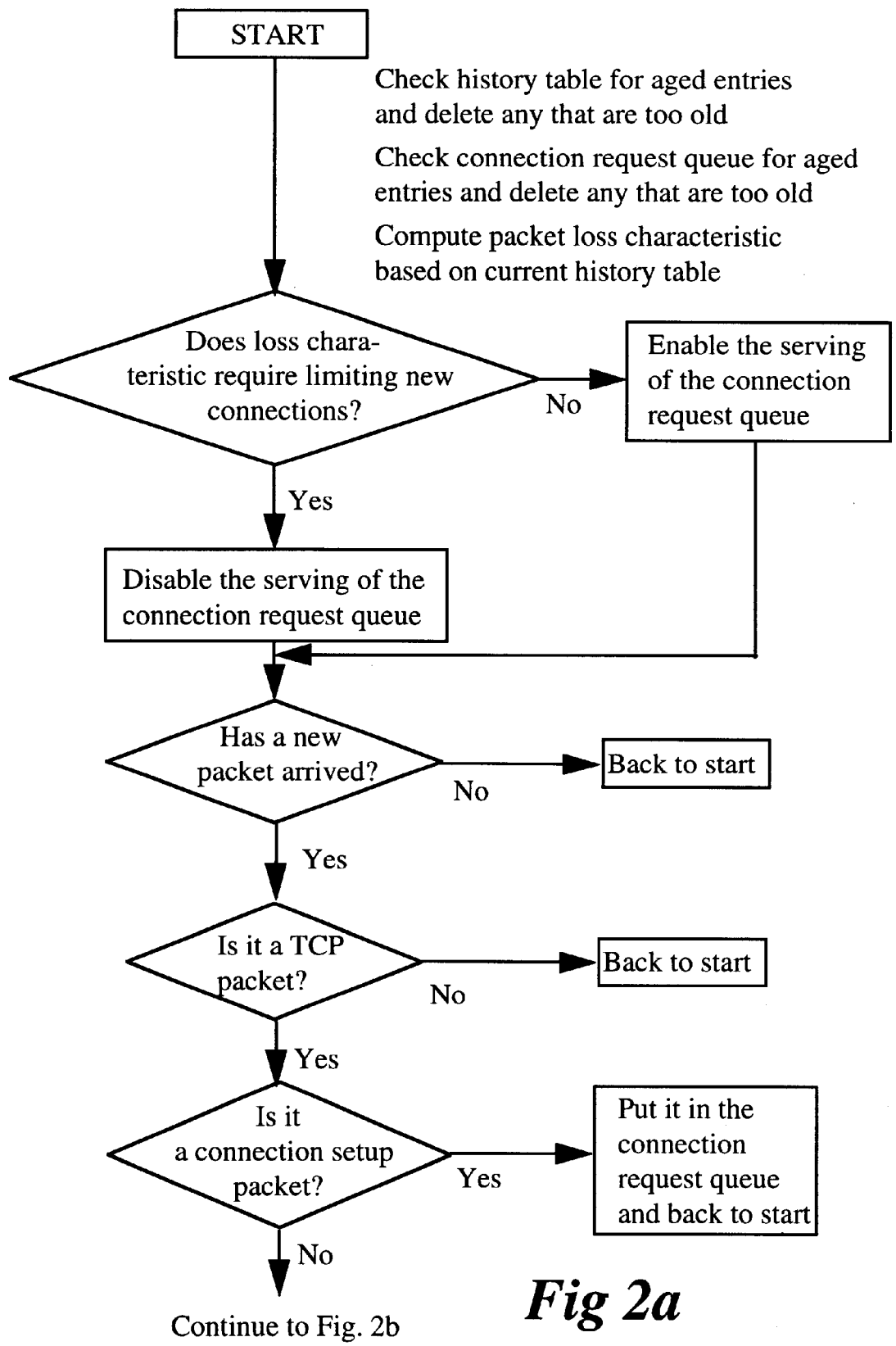
FIGS. 2a and 2b are a flow chart for the case where TCP admission control is applied in a traffic link.
Figure 2B:
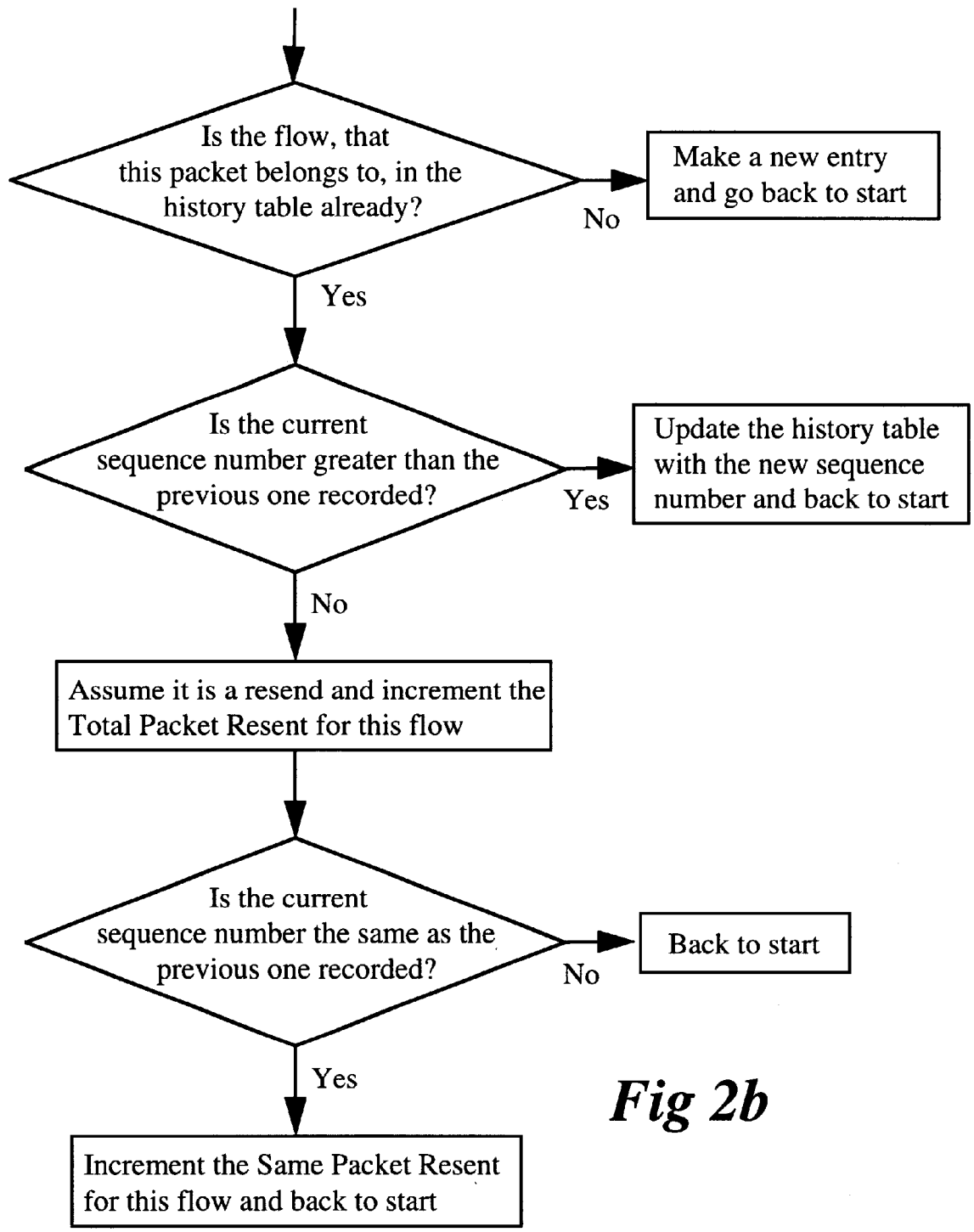

FIGS. 2a and 2b are a flow chart for the case where TCP admission control is applied in a traffic link rather than in a router.

Figure 3:
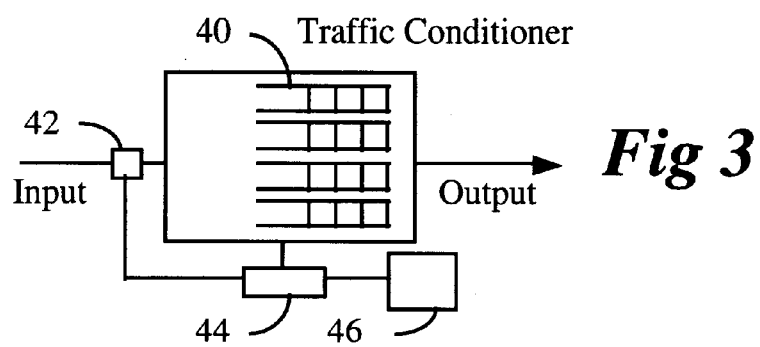
FIG. 3 illustrates the relationship of admission control with the traffic conditioner.

As mentioned earlier, the applicant's pending applications describe traffic conditioners and FIG. 3 shows one of such conditioners. In the Figure, a traffic conditioner 40 includes a plurality of queues 42, at least one for each class of TCP traffic. Every packet of an input stream is inspected and identified at 44 using, for example, IP addresses, ports, etc. A controller 46 characterises the flow (using rate, duration, etc.) and assigns it a class. The controller refers to a database 48 and uses output scheduling to allocate bandwidth among classes. It can implement an admission control policy of the present invention for a class before delivering an output stream toward downstream nodes or to peripherals. In this case it is necessary to work out whether a packet has been discarded, by looking for a second copy of it passing through the link.

In another embodiment, the admission control is performed in the router where the discarded packets can be inspected directly as the discard decision is made at the buffer of the router.

In this case the history table contains, for each active flow (or as many flows as can be handled), the following entries:

The first entry is a count of discarded packets for that flow (Total Packet Discarded).

The second entry is a count of how many times the currently recorded packet (that is the currently stored sequence number) has been discarded (Same Packet Discarded).

The third entry is the time that the most recent update was made for that flow. After some period of inactivity the flow is taken out of the table.

This information is used to look for patterns of discard that indicate congestion problems. The total number of discards as a fraction of the total number of packets is a measure of buffer congestion.

Seeing the same packet resent multiple times will suggest that the connection is experiencing time-out or at least a very high loss rate.

There will be many variations on what information is stored and what algorithm is used to assess whether new connections should be enabled.

In another embodiment, if the admission control is performed at the router, packets from one or more existing connections can be discarded to control congestion at its buffer. The discarding action can be taken together with action of limiting the set-up of new connections, latter having been described above.

Figure 4A:
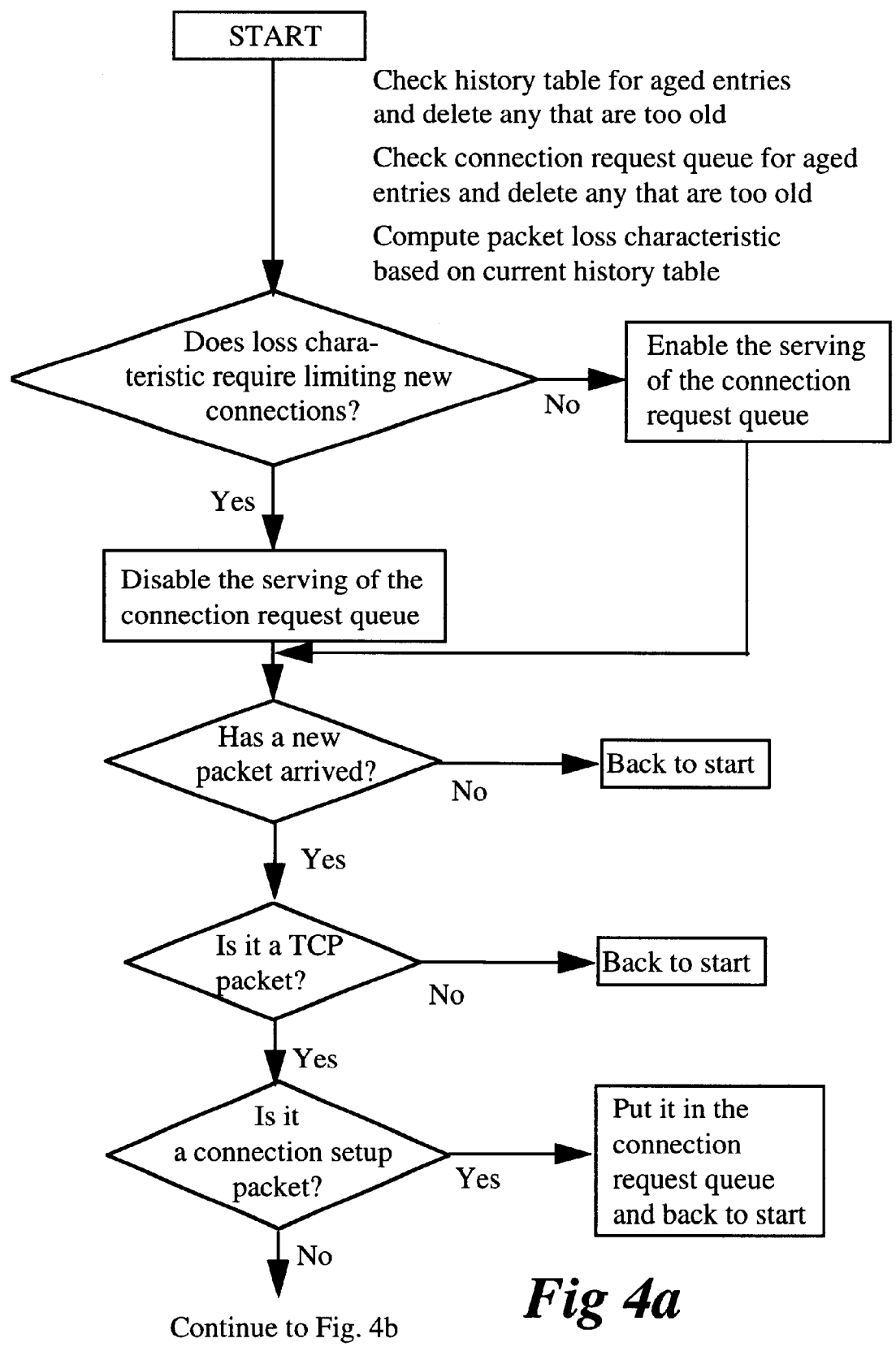
FIGS. 4a and 4b are a flow chart for the case where TCP admission control is applied in a router.
Figure 4B:
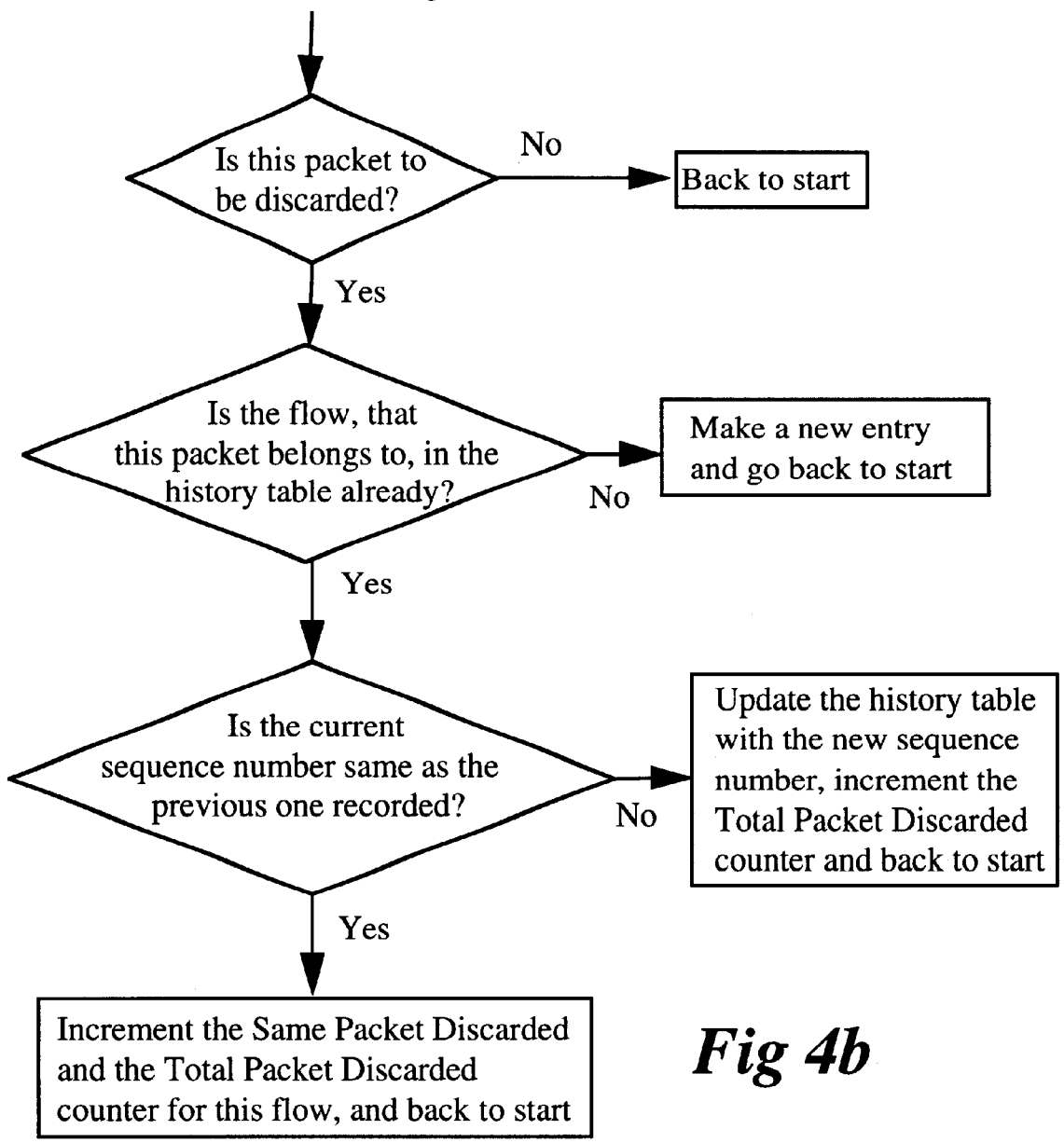

FIGS. 4a and 4b are a flow chart for the case where TCP admission control is applied in a router rather than in a traffic link.

Figure 5:
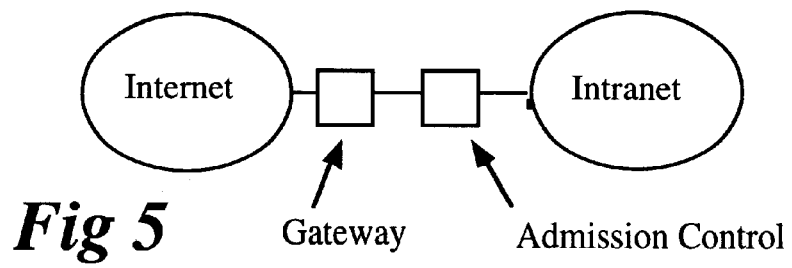
FIGS. 5 and 6 show possible locations of admission control of the invention.
Figure 6:
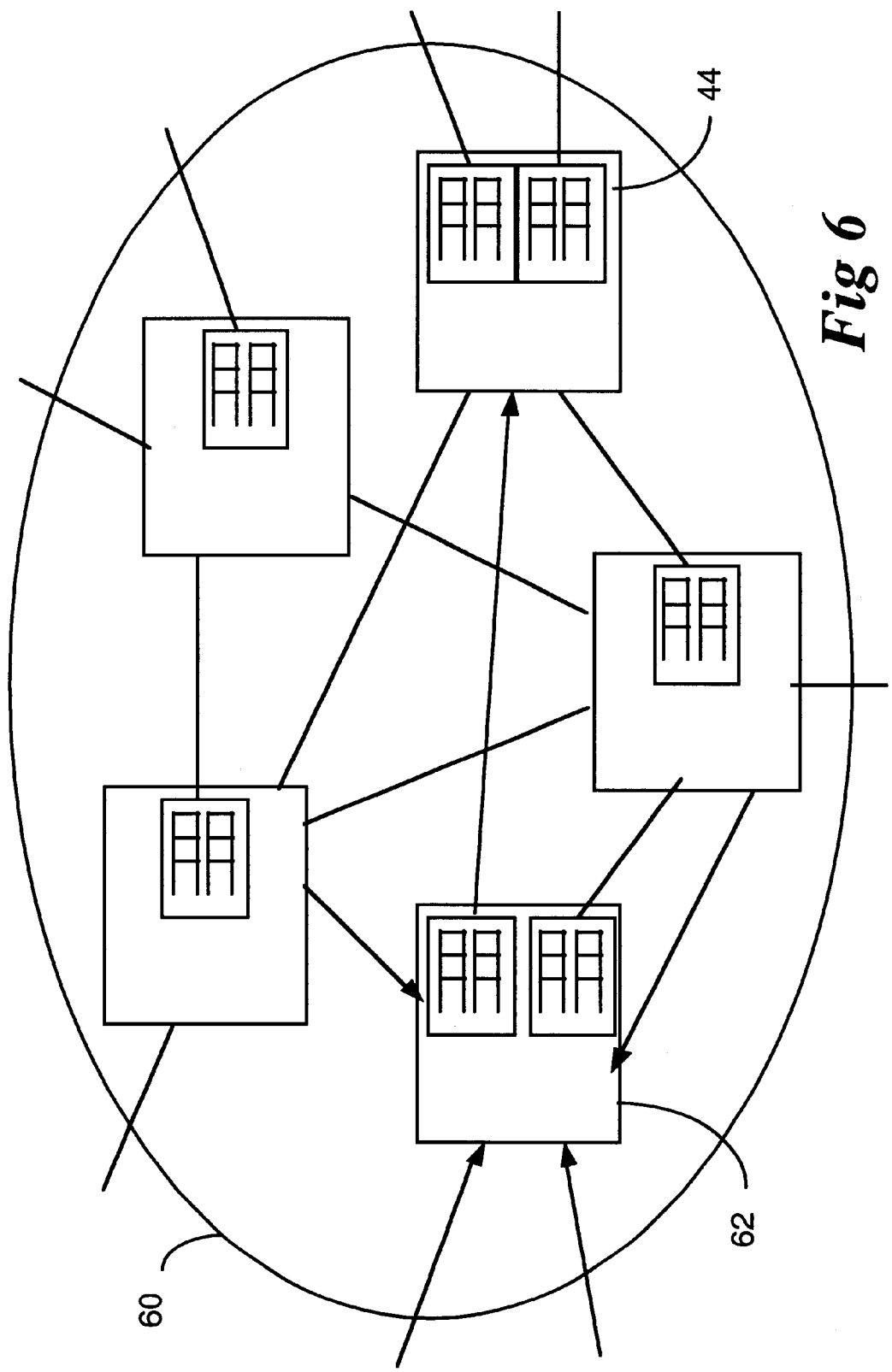

Like the traffic conditioning of the pending applications, the admission control can take place at various places in the data network and can be biased toward certain kinds of TCP traffic. For example, as gateways are often a bottleneck and bulk flows can decrease response times for interactive users, an admission control can be located at a place shown in FIG. 5 which will alleviate this problem. In FIG. 6, traffic conditioners are located at a plurality of IP switches which form a data network 60.

What is claimed is:

1. In a packet data network for multimedia traffic having one or more nodes in which network one or more packets are discarded to control congestion; a method of performing admission control to TCP traffic flows comprising steps of;

storing all TCP connection setup packets in a connection request queue;

monitoring packets of all active TCP traffic flows according to their port numbers and sequence numbers;

recording the count of either resent or discarded packets for any TCP traffic flows;

building a history table containing the history of the sequence numbers, port numbers, and the count of either resent or discarded packets;

computing a packet loss characteristic using the contents of the history table; and deciding enabling or disabling the connection request queue based on the packet loss characteristic with respect to a predefined pattern.

2. The method of performing admission control to TCP traffic flows according to claim 1 wherein the step of computing a packet loss characteristic comprises step of:

deriving the total number of either resends or discards as a fraction of the total number of TCP packets of the TCP traffic flow.

3. The method performing admission control to TCP traffic flow according to claim 2, comprising the further step of:

deciding to disable the connection request queue when the fraction reaches a preset threshold.

4. The method of performing admission control to TCP traffic flows according to claim 1, comprising a further step of:

enabling the connection request queue at a controlled pace.

5. A TCP admission control apparatus for controlling congestion of a data network, comprising:

a TCP output buffer for inspecting all the TCP packets of an incoming traffic stream according to their port numbers and sequence numbers;

a connection request queue for storing new connection requests;

a history table for recording the sequence numbers, port numbers and a count of either recent or discarded packets in order to compute a packet loss characteristic; and a queue controller for enabling or disabling the connection request upon detecting the matching of the packet loss characteristic with a predefined pattern.

6. The TCP admission control apparatus according to claim 5 wherein the history table contains the total number of packets of the TCP traffic flow.

7. The method of performing admission control to TCP traffic flows according to claim 1 wherein the step of recording further comprises recording the time that the most recent update was made for a specified TCP traffic flow.

8. The method of performing admission control to TCP traffic flows according to claim 7 wherein the specified TCP traffic flow is removed from the history table after a predefined period of inactivity.

9. The method of performing admission control to TCP traffic flows according to claim 1 wherein the method is performed in a router.

10. The method of performing admission control to TCP traffic flows according to claim 1 wherein the method is performed in a controller integral to a traffic conditioner.

11. The method of performing admission control to TCP traffic flows according to claim 1 further comprising the step of clearing all entries of the history table whenever the connection request queue is re-enabled.

12. The method of performing admission control to TCP traffic flows according to claim 1 further comprising the step of purging all entries in the history table periodically from time to time or after a certain preset period.

13. The TCP admission control apparatus according to claim 5 wherein the history table records the time that the most recent update was made for a specified TCP traffic flow.

14. The TCP admission control apparatus according to claim 13 wherein the specified TCP traffic flow is removed from the history table after a predefined period of inactivity.

15. The TCP admission control apparatus according to claim 5 wherein the apparatus is a router.

16. The TCP admission control apparatus according to claim 5 wherein the history table clears all entries whenever the connection request queue is re-enabled.

17. The TCP admission control apparatus according to claim 5 wherein the history table all entries periodically from time to time or after a certain preset period.

18. The TCP admission control apparatus according to claim 5 wherein the packet loss characteristic is computed by deriving the total number of either resends or discards as a fraction of the total number of TCP packets of the TCP traffic flow.

19. The TCP admission control apparatus according to claim 18 wherein the queue controller disables the connection request queue when the fraction reaches a preset threshold.

20. The TCP admission control apparatus according to claim 5 wherein the connection request queue is enabled at a controlled pace.

* * * * *